(12) United States Patent
Shibata et al.

(10) Patent No.: US 9,148,002 B2
(45) Date of Patent: Sep. 29, 2015

(54) ELECTRICAL JUNCTION BOX

(75) Inventors: Satoshi Shibata, Shiga (JP); Fumikazu Naimi, Shiga (JP); Akihisa Watanabe, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 59 days.

(21) Appl. No.: 14/007,301

(22) PCT Filed: Mar. 23, 2012

(86) PCT No.: PCT/JP2012/002035
§ 371 (c)(1),
(2), (4) Date: Dec. 9, 2013

(87) PCT Pub. No.: WO2012/127876
PCT Pub. Date: Sep. 27, 2012

(65) Prior Publication Data
US 2014/0083732 A1    Mar. 27, 2014

(30) Foreign Application Priority Data
Mar. 24, 2011  (JP) ................................ 2011-066613

(51) Int. Cl.
*H02G 3/08*   (2006.01)
*B60R 16/023* (2006.01)
*H02G 3/18*   (2006.01)

(52) U.S. Cl.
CPC .............. *H02G 3/08* (2013.01); *B60R 16/0238* (2013.01); *B60R 16/0239* (2013.01); *H02G 3/086* (2013.01); *H02G 3/18* (2013.01)

(58) Field of Classification Search
CPC .. H02G 3/08; B60R 16/0239; B60R 16/0238; B60R 16/03; H01R 9/2491; Y10S 439/949

USPC ........ 174/50, 50.52, 520, 527, 535, 559, 560; 439/949, 76.1, 76.2, 212
See application file for complete search history.

(56) References Cited

U.S. PATENT DOCUMENTS 5,295,847 A * 3/1994 Ozaki et al. .................... 439/212
5,823,819 A * 10/1998 Kondo et al. .................. 439/487

FOREIGN PATENT DOCUMENTS

JP   09-327112 A   12/1997
JP   2004-48857 A   2/2004

(Continued)

OTHER PUBLICATIONS

International Search Report for PCT Application Serial No. PCT/JP2012/002035 mailed May 22, 2012, 2 pages (with translation).

*Primary Examiner* — Angel R Estrada
*Assistant Examiner* — Dimary Lopez Cruz
(74) *Attorney, Agent, or Firm* — Amin, Turocy & Watson, LLP

(57) ABSTRACT

Provided is an electrical junction box that enables appropriate protection of a bus bar and also enables downsizing. The electrical junction box includes a terminal reception block (11) that accommodates a connection terminal, and a casing (12) that accommodates the terminal reception block (11). The terminal reception block (11) is configured such that a bus bar (19) is inserted into the terminal reception block (11) and an end portion of the bus bar (19) at the side opposite to the direction of insertion protrudes from the terminal reception block (11). The casing (12) includes a protector (20) that is configured to cover the end portion of the bus bar (19) protruding from the terminal reception block (11). Making the terminal reception block (11) accommodated in the casing (12) causes the end portion of the bus bar (19) to be covered with the protector (20).

4 Claims, 5 Drawing Sheets

(56) References Cited

FOREIGN PATENT DOCUMENTS

| | | |
|---|---|---|
| JP | 2006-4773 A | 1/2006 |
| JP | 2009-89530 A | 4/2009 |
| JP | 2009-165220 A | 7/2009 |
| JP | 2010-81738 A | 4/2010 |

* cited by examiner

ELECTRICAL JUNCTION BOX

CROSS-REFERENCE TO RELATED APPLICATION

The subject application is a U.S. national stage application of PCT Application Serial No. PCT/JP2012/002035, filed Mar. 23, 2012, and entitled "ELECTRICAL JUNCTION BOX", which claims priority to Japanese Patent Application Serial No. 2011-066613, filed Mar. 24, 2011, the disclosures of which are incorporated herein by reference in their entirety.

TECHNICAL FIELD

The present invention relates to a configuration for protecting a bus bar in an electrical junction box.

BACKGROUND ART

An electrical junction box is known that houses a number of electrical components such as a fuse and a relay in a vehicle such as an automobile. The electrical components are connected to electronic devices that are arranged in respective parts of the vehicle. Such an electrical junction box is disclosed in, for example, Patent Document 1 and Patent Document 2. The electrical junction boxes disclosed in the Patent Document 1 and the Patent Document 2 include a component mounting block (a relay block, a cassette block) to which electrical components are mounted, and a casing that houses the component mounting block.

In the electrical junction box, power supply to the electrical component may sometimes be made through a bus bar. An electrical junction box including the bus bar is disclosed in, for example, Patent Document 3 and Patent Document 4. The Patent Document 3 discloses a configuration in which a bus bar is inserted into an insulating block from the upper side of the insulating block and screwed. The Patent Document 4 points out that the configuration disclosed in the Patent Document 3 requires that a slit for receiving the bus bar be formed in a cavity, which presents problems of a deterioration in the strength, a deterioration in the accuracy, and the like. To solve the problems, the Patent Document 4 discloses a configuration in which the bus bar is inserted from the lower side of the insulating block. The Patent Document 4 states that this eliminates the need to form a slit for the insertion of the bus bar in a cavity in an upper portion of the insulating block.

PRIOR-ART DOCUMENTS

Patent Documents

Patent Document 1: Japanese Patent Application Laid-Open No. 2004-48857
Patent Document 2: Japanese Patent Application Laid-Open No. 2010-81738
Patent Document 3: Japanese Patent Application Laid-Open No. 2006-4733
Patent Document 4: Japanese Patent Application Laid-Open No. 2009-89530

SUMMARY OF THE INVENTION

Problems to be Solved by the Invention

In the above-described electrical junction box, a configuration for protecting a bus bar from being exposed to the outside is necessary. In the configuration shown in the Patent Document 3, in order to protect the bus bar by covering the whole of the bus bar, it is necessary that the slit for receiving the bus bar is formed deeper than the height of the bus bar. Forming such a deep slit causes a problem that the size of the insulating block increases. The configuration disclosed in the Patent Document 4 does not include the slit, but still makes the bus bar housed in the insulating block. Therefore, a size increase of the insulating block is inevitable in order to protect the bus bar by covering the whole of the bus bar.

The present invention has been made in view of the circumstances described above, and a primary object of the present invention is to provide an electrical junction box that enables appropriate protection of a bus bar and also enables downsizing.

Means for Solving the Problems and Effects Thereof

Problems to be solved by the present invention are as described above, and next, means for solving the problems and effects thereof will be described.

In an aspect of the present invention, an electrical junction box having the following configuration is provided. The electrical junction box includes a terminal reception part that receives a connection terminal, and a casing that houses the terminal reception part. The terminal reception part is configured such that a bus bar is inserted into the terminal reception part and an end portion of the bus bar protrudes from the terminal reception part. The casing includes a protector that is configured to cover the end portion of the bus bar protruding from the terminal reception part. Making the terminal reception part housed in the casing causes the end portion of the bus bar to be covered with the protector.

Such a configuration in which the bus bar protrudes from the terminal reception part makes the terminal reception part compact, as compared with the conventional configuration in which the terminal reception part covers the whole of the bus bar. The end portion of the bus bar protruding from the terminal reception part can be protected by being covered with the protector that is provided in the casing side. Since merely housing the terminal reception part within the casing can cover the end portion of the bus bar, any special operation, and the like, for protecting the end portion of the bus bar is not necessary.

In the electrical junction box, it is preferable that the protector is formed as a groove having a substantially U-shaped cross-section, and configured such that the bus bar is received within the groove.

This can completely cover the end of the bus bar.

In the electrical junction box, it is preferable that the width of an opening portion of the protector having the groove-like shape is larger than the thickness of the bus bar.

This enables the bus bar to be smoothly inserted into the protector.

In the electrical junction box, it is preferable that the terminal reception part is a member separate from the casing.

Accordingly, dies for the terminal reception part and the casing are separately prepared. Therefore, the die for the terminal reception part, whose structure tends to be complicated, can be downsized. This makes it easy to perform maintenance of the die. It may be also possible that the terminal reception part and the casing are made of different materials. For example, only the terminal reception part is made of a heat resistant material or a heat insulating material while the casing is made of an inexpensive material.

EMBODIMENT FOR CARRYING OUT THE INVENTION

An embodiment of the present invention will be described with reference to the drawings. An electrical junction box 10 according to this embodiment includes a terminal reception block (terminal reception part) 11 and a casing 12 that houses the terminal reception block 11. The terminal reception block 11 and the casing 12 are formed from a synthetic resin.

Figure 1:
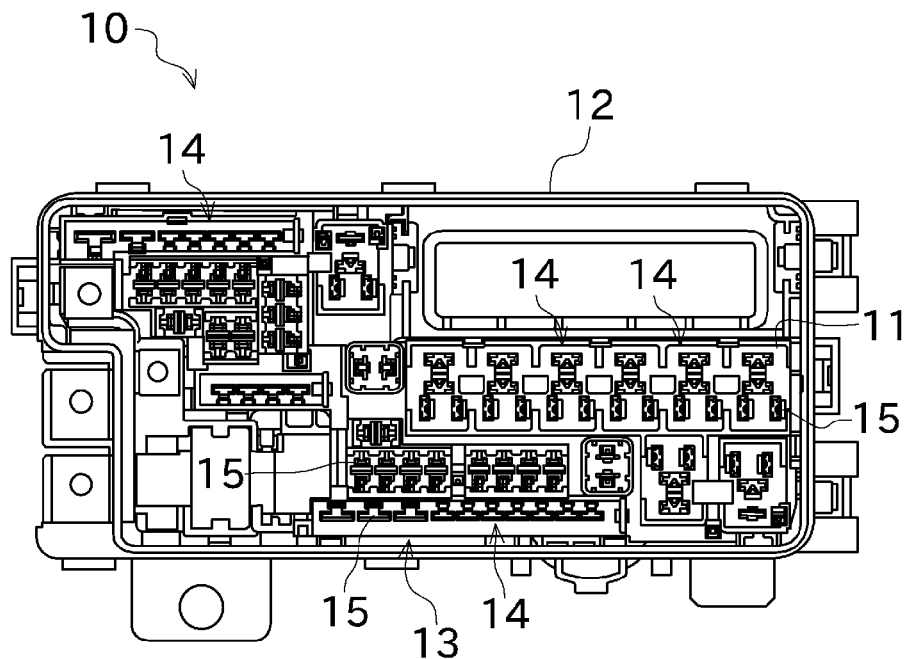
FIG. 1 A plan view of an electrical junction box according to an embodiment of the present invention as seen from the component mounting side.

The terminal reception block 11 has a component mounting surface 13. FIG. 1 is a view of the electrical junction box 10 as seen from the component mounting surface 13 side. A plurality of connectors 14 are formed on the component mounting surface 13. Electrical components (not shown) such as a fuse and a relay are mounted to the plurality of connectors 14. The electrical components are mounted to the connectors 14, and thereby electrically connected to connection terminals (not shown) included in these connectors.

Figure 2:
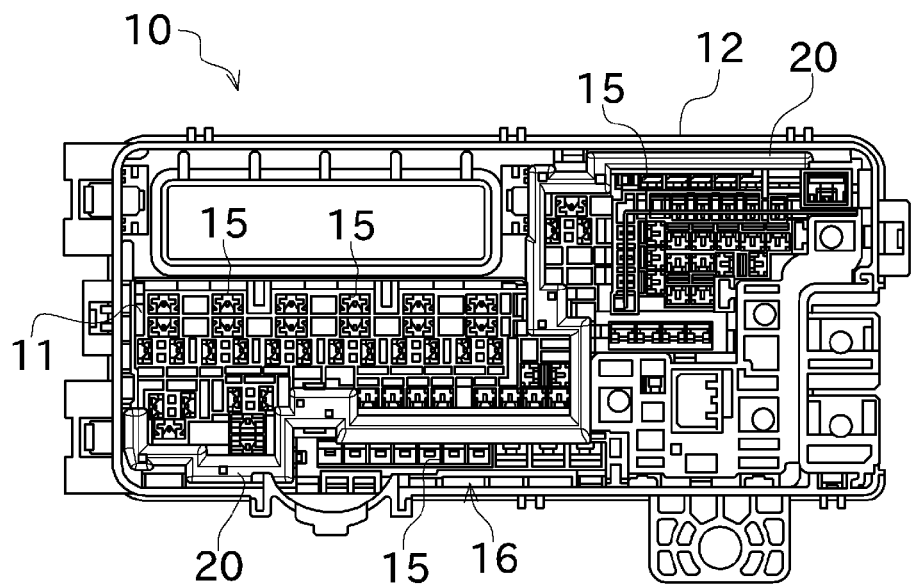
FIG. 2 A bottom view of the electrical junction box as seen from the terminal insertion surface side.

Each of the connectors 14 has a terminal reception space 15 that receives the connection terminal. A lance (not shown) for latching the connection terminal is formed in the terminal reception space 15. The terminal reception space 15 penetrates the terminal reception block 11, and communicates with the side opposite to the component mounting surface 13. In the terminal reception block 11, a surface opposite to the component mounting surface 13 is defined as a terminal insertion surface 16. FIG. 2 is a view of the electrical junction box 10 as seen from the terminal insertion surface 16 side. The connection terminal is inserted from the terminal insertion surface 16 side into the terminal reception space 15.

Figure 3:
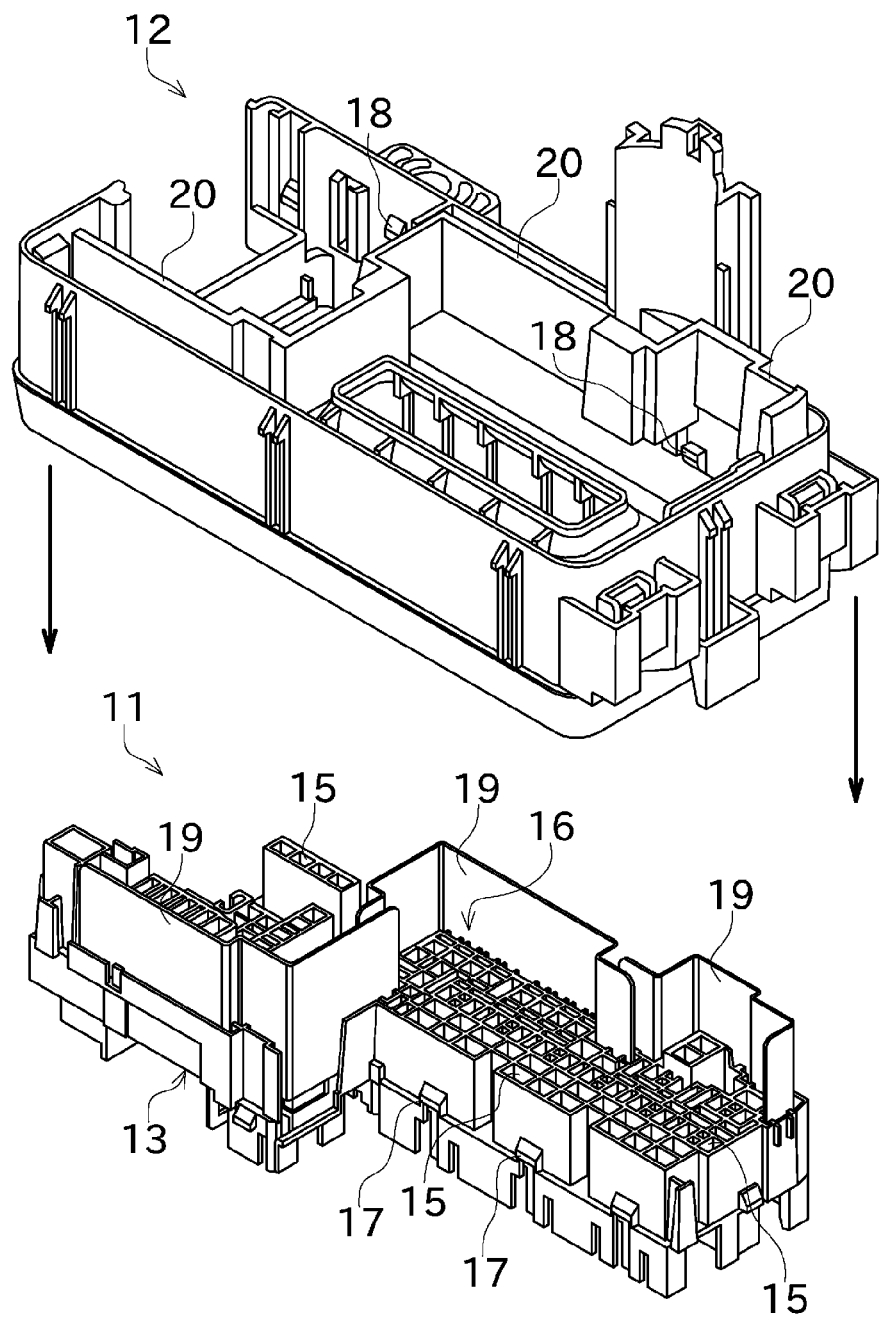
FIG. 3 A perspective view showing a situation where a casing is attached to a terminal reception block.

As shown in FIG. 3, the terminal reception block 11 has block-side engagement parts 17 that are engageable with the casing 12. The casing 12 has, at positions corresponding to the block-side engagement parts 17, casing-side engagement parts 18 that are engageable with the block-side engagement parts 17. When the terminal reception block 11 is housed in the casing 12, the block-side engagement parts 17 and the casing-side engagement parts 18 are brought into engagement, and thereby the terminal reception block 11 and the casing 12 are fixed to each other.

A specified terminal reception space 15 is configured such that a bus bar 19 is inserted from the terminal insertion surface 16 side. The bus bar 19 is formed by a metal plate being bent as appropriate. The bus bar 19 is connected to the electrical component mounted to the connector 14, for power supply and the like. The bus bar 19 has a latch hole (not shown). A cantilevered lance (not shown) included in the terminal reception block 11 is engaged with the latch hole, and thereby the bus bar 19 is fixed to the terminal reception block 11.

Figure 4:
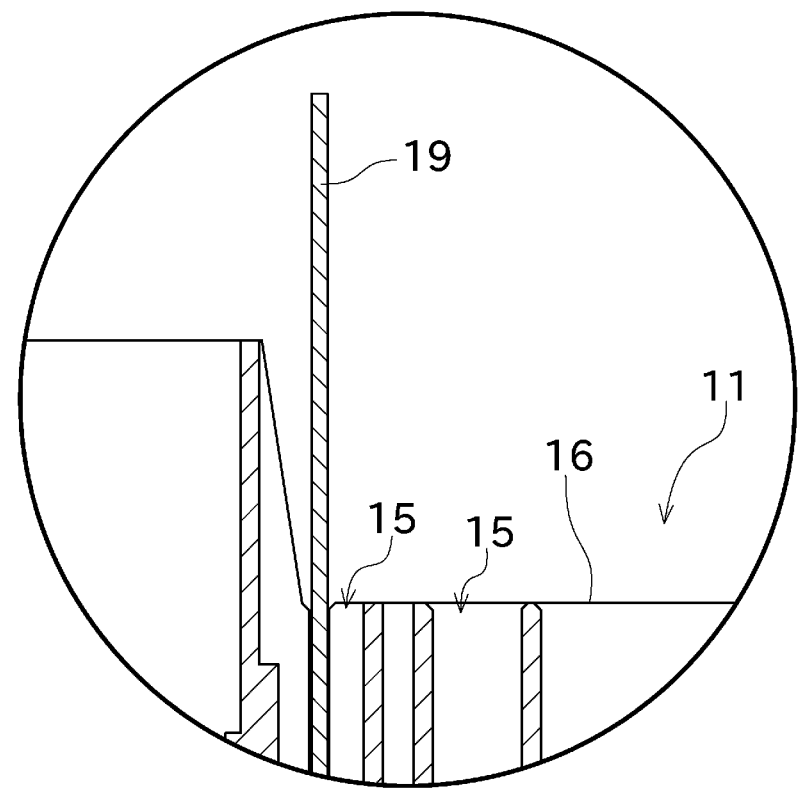
FIG. 4 A cross-sectional view of the terminal reception block.

The bus bar 19 is configured to protrude from the terminal insertion surface 16 of the terminal reception block 11 in a state of being inserted in the terminal reception space 15, as shown in FIGS. 3 and 4. Thus, in the electrical junction box 10 of this embodiment, the terminal reception block 11 does not cover an end portion of the bus bar 19 at the side opposite to the direction of insertion.

To be specific, the conventional electrical junction box is configured to protect a bus bar by covering the bus bar with a terminal reception block, which involves a problem that the size of the terminal reception block increases. In the configuration of this embodiment, it is not necessary that the whole of the bus bar 19 is covered with the terminal reception block 11. This enables downsizing of the terminal reception block 11, and thus the electrical junction box 10 as a whole can be made compact.

Moreover, in the electrical junction box 10 of this embodiment, a protector 20 for protecting the bus bar 19 is provided in the casing 12. This enables the bus bar 19 protruding from the terminal reception block 11 to be covered and protected.

Figure 5:
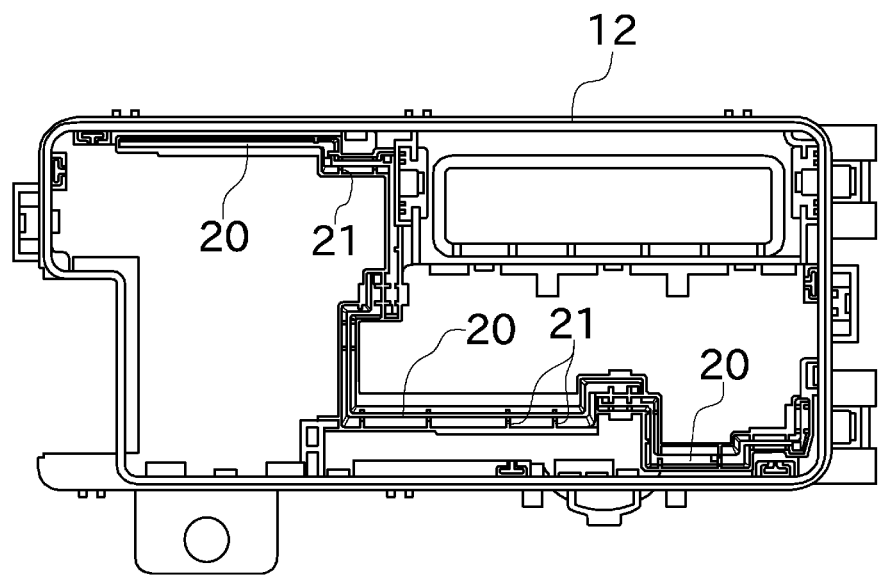
FIG. 5 A plan view of the casing.
Figure 6:
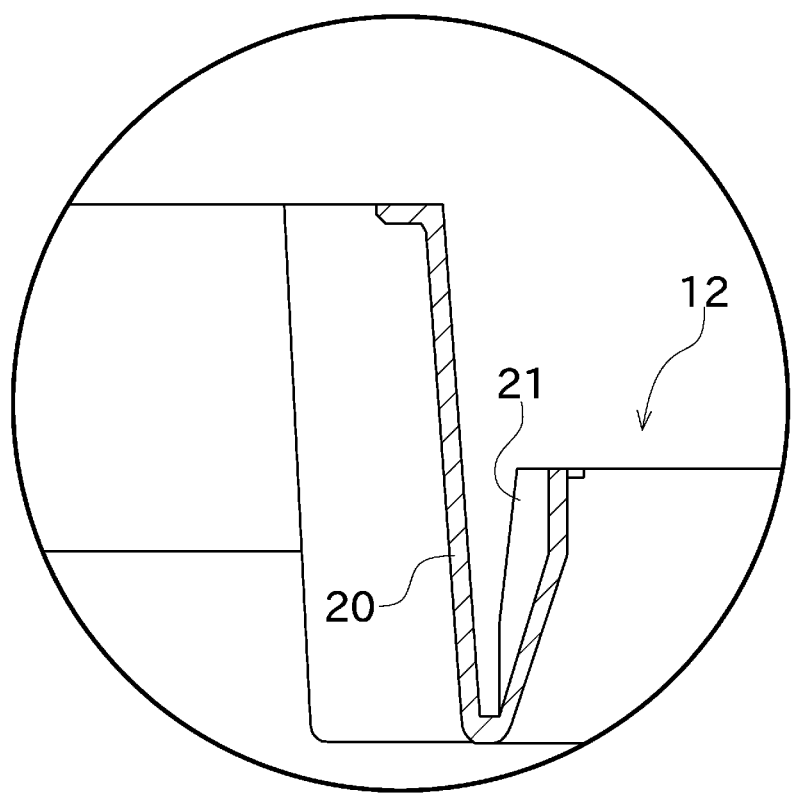
FIG. 6 A cross-sectional view of a protector provided in the casing.

As shown in FIGS. 2, 3, and 5, the protector 20 is formed as a rib-shaped part that is provided along the lengthwise direction of the bus bar 19 (the direction perpendicular to the thickness direction of the bus bar 19 and to the direction of insertion of the bus bar 19 into the terminal reception block 11). The rib-shaped protector 20 is hollow, and is opened at the one side thereof. More specifically, as shown in FIG. 6, the protector 20 is formed as a groove having a substantially U-shaped (substantially C-shaped) cross-section when cut along a plane perpendicular to the lengthwise direction of the bus bar 19.

Figure 7:
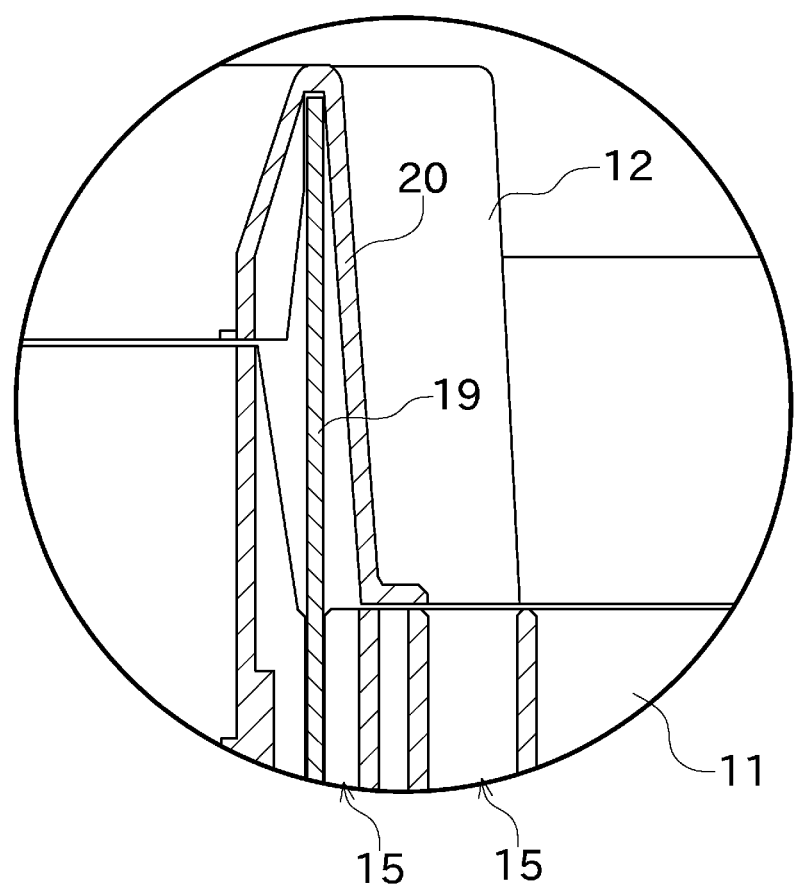
FIG. 7 A cross-sectional view showing a situation where a bus bar is covered with the protector.

As shown in FIG. 7, the end portion of the bus bar 19 protruding from the terminal reception block 11 is inserted within the protector 20 having a U-shaped cross-section. Thereby, the end portion of the bus bar 19 is covered and protected. Forming the protector 20 with a U-shaped cross-section enables the end portion of the bus bar 19 to be completely covered. Therefore, the bus bar 19 can be successfully protected.

The width of an opening portion of the protector 20 is slightly larger than the thickness of the bus bar 19, in order that the bus bar 19 can be easily inserted. As shown in FIG. 6, an inner wall surface of the protector 20 flares toward the opening portion. This makes it easier that the bus bar 19 is inserted into the protector 20. A rib portion 21 for guiding the bus bar 19 is provided in a part of the inner wall surface of the protector 20.

The electrical junction box 10 having the above-described configuration is assembled in the following manner.

Firstly, the connection terminal and the bus bar 19 are inserted from the terminal insertion surface 16 side into the terminal reception space 15. At this time, the connection terminal and the bus bar 19 are latched by the lance, and fixed against falling out of the terminal reception space 15. As described above, the bus bar 19 inserted into the terminal reception space 15 has its end portion protruding from the terminal insertion surface 16 of the terminal reception block 11.

Then, the casing 12 is attached to the terminal reception block 11 from the terminal insertion surface 16 side. The protector 20 is formed such that, at this time, the opening portion of the protector 20 is directed to the terminal reception block 11 side. The protector 20 is provided along the lengthwise direction of the bus bar 19, as described above. The protector 20 is formed at a position corresponding to the position of the bus bar 19 inserted in the terminal reception block 11.

Accordingly, attaching the casing 12 to the terminal reception block 11 causes the bus bar 19 to be inserted to the inside of the protector 20 without the need for any special operation. As described above, the width of the opening portion of the protector 20 is larger than the thickness of the bus bar 19, and additionally the protector 20 is formed so as to flare toward the opening portion. Therefore, the bus bar 19 can be smoothly inserted into the protector 20 without the need for positioning of the bus bar 19, and the like.

Thus, merely attaching the casing 12 to the terminal reception block 11 can provide covering and protection to the end portion of the bus bar 19 protruding from the terminal reception block 11. Then, the block-side engagement parts 17 and the casing-side engagement parts 18 are fitted to each other, and thereby the terminal reception block 11 and the casing 12 are fixed to each other.

Then, as appropriate, electrical components such as a relay and a fuse are attached to the connectors 14 formed at the component mounting surface 13 side of the terminal reception block 11. Thereby, the electrical components are electrically connected to the connection terminals within the terminal reception space 15 or to the bus bar 19.

Finally, if needed, a lower covering (not shown) that covers the terminal insertion surface 16 and an upper covering (not shown) that covers the component mounting surface 13 are attached.

As thus far described, the electrical junction box 10 of this embodiment includes the terminal reception block 11 that receives the connection terminals, and the casing 12 that houses the terminal reception block 11. The terminal reception block 11 is configured such that the bus bar 19 is inserted into the terminal reception block 11 and the end portion of the bus bar 19 at the side opposite to the direction of insertion protrudes from the terminal reception block 11. The casing 12 includes the protector 20 that is configured to cover the end portion of the bus bar 19 protruding from the terminal reception block 11. Making the terminal reception block 11 housed in the casing 12 causes the end portion of the bus bar 19 to be covered with the protector 20.

Such a configuration in which the bus bar 19 protrudes from the terminal reception block 11 makes the terminal reception block 11 compact, as compared with the conventional configuration in which the terminal reception block covers the whole of the bus bar. The end portion of the bus bar 19 protruding from the terminal reception block 11 can be protected by being covered with the protector 20 that is provided in the casing 12 side. Since merely housing the terminal reception block 11 within the casing 12 can cover the end portion of the bus bar 19, any special operation, and the like, for protecting the end portion of the bus bar 19 is not necessary.

In the electrical junction box of this embodiment, the protector 20 is formed as a groove having a substantially U-shaped cross-section, and configured such that the bus bar 19 is received within the groove.

This can completely cover the end of the bus bar 19.

In the electrical junction box 10 of this embodiment, the width of an opening portion of the protector 20 having the groove-like shape is larger than the thickness of the bus bar 19.

This enables the bus bar 19 to be smoothly inserted into the protector 20.

In the configuration of this embodiment, dies for the terminal reception block 11 and the casing 12 are separately prepared. Therefore, the die for the terminal reception block 11, whose structure tends to be complicated, can be downsized. This makes it easy to perform maintenance of the die, and the cost of the electrical junction box 10 can be reduced.

Additionally, even when, for example, a heat resistance is demanded, it is possible that only the terminal reception block 11 is made of a heat resistant material or a heat insulating material while the casing 12 is made of an inexpensive material. Therefore, the cost of the electrical junction box 10 can be reduced.

While a preferred embodiment of the present invention has been described above, the above-described configurations can be changed, for example, as follows.

The shapes of the terminal reception part, the casing, the bus bar, and the like, are not limited to the illustrated ones, but may be changed as appropriate.

Although the protector is a groove-like shape having a U-shaped cross-section in the embodiment described above, the shape of the protector is not limited to this as long as it can cover and protect the bus bar.

Although the bus bar 19 is inserted from the terminal insertion surface 16 side in the embodiment described above, it may be also acceptable that the bus bar 19 is inserted from the component mounting surface 13 side so that the bus bar 19 penetrates the terminal reception block 11 and protrudes toward the terminal insertion surface 16 side.

DESCRIPTION OF THE REFERENCE NUMERALS 10 electrical junction box
11 terminal reception block (terminal reception part)
12 casing
19 bus bar
20 protector

The invention claimed is:

1. An electrical junction box comprising:
   a terminal reception part that receives a connection terminal; and
   a casing that houses the terminal reception part,
   the terminal reception part being configured as a member separate from the casing,
   the terminal reception part including a terminal reception space that penetrates the terminal reception part and communicates with a terminal insertion surface,
   the terminal reception part being configured such that a bus bar is inserted into the terminal reception part and an end portion of the bus bar protrudes from the terminal reception part,
   the casing including a protector that is configured to cover the end portion of the bus bar protruding from the terminal reception part without exposing the end portion of the bus bar to an outside portion of the casing,
   making the terminal reception part housed in the casing causes the end portion of the bus bar to be covered with the protector.

2. The electrical junction box according to claim 1, wherein the protector is formed as a groove having a substantially U-shaped cross-section, and configured such that the bus bar is received within the groove.

3. The electrical junction box according to claim 2, wherein the width of an opening portion of the protector formed as the groove is larger than the thickness of the bus bar.

4. The electrical junction box according to any one of claims 1 to 3, wherein
   the terminal reception part is a terminal reception block.

* * * * *